Figure 5:
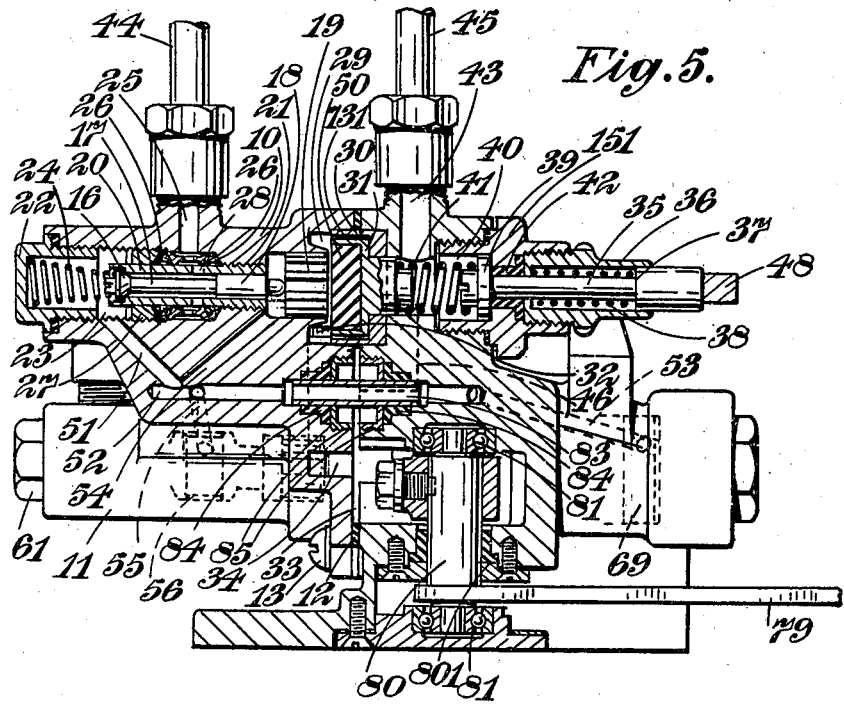

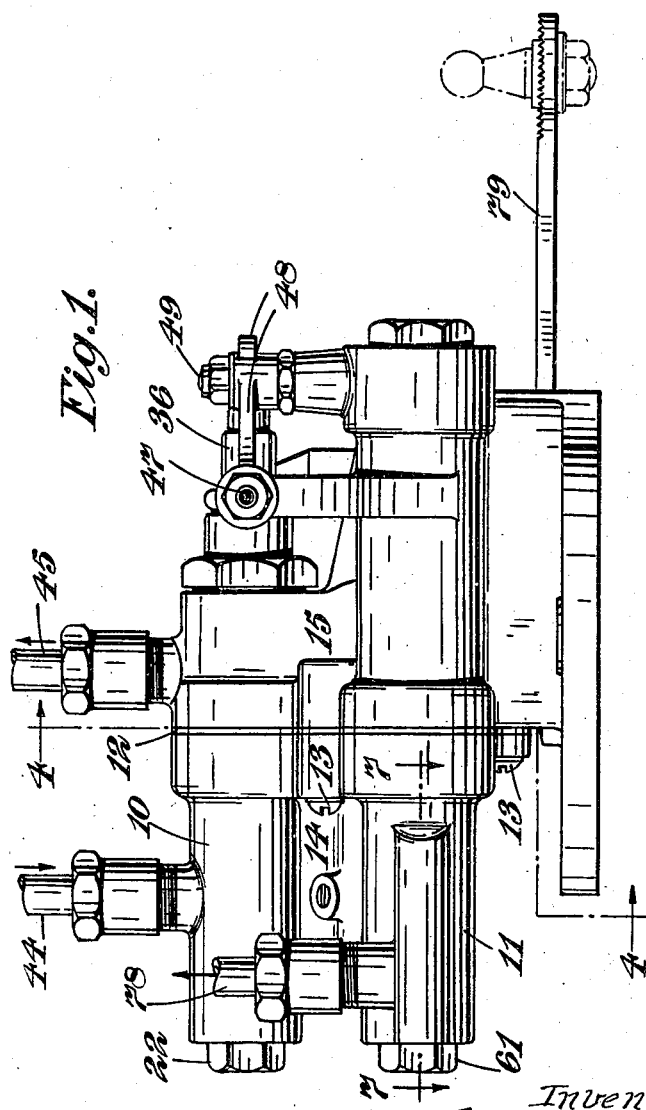

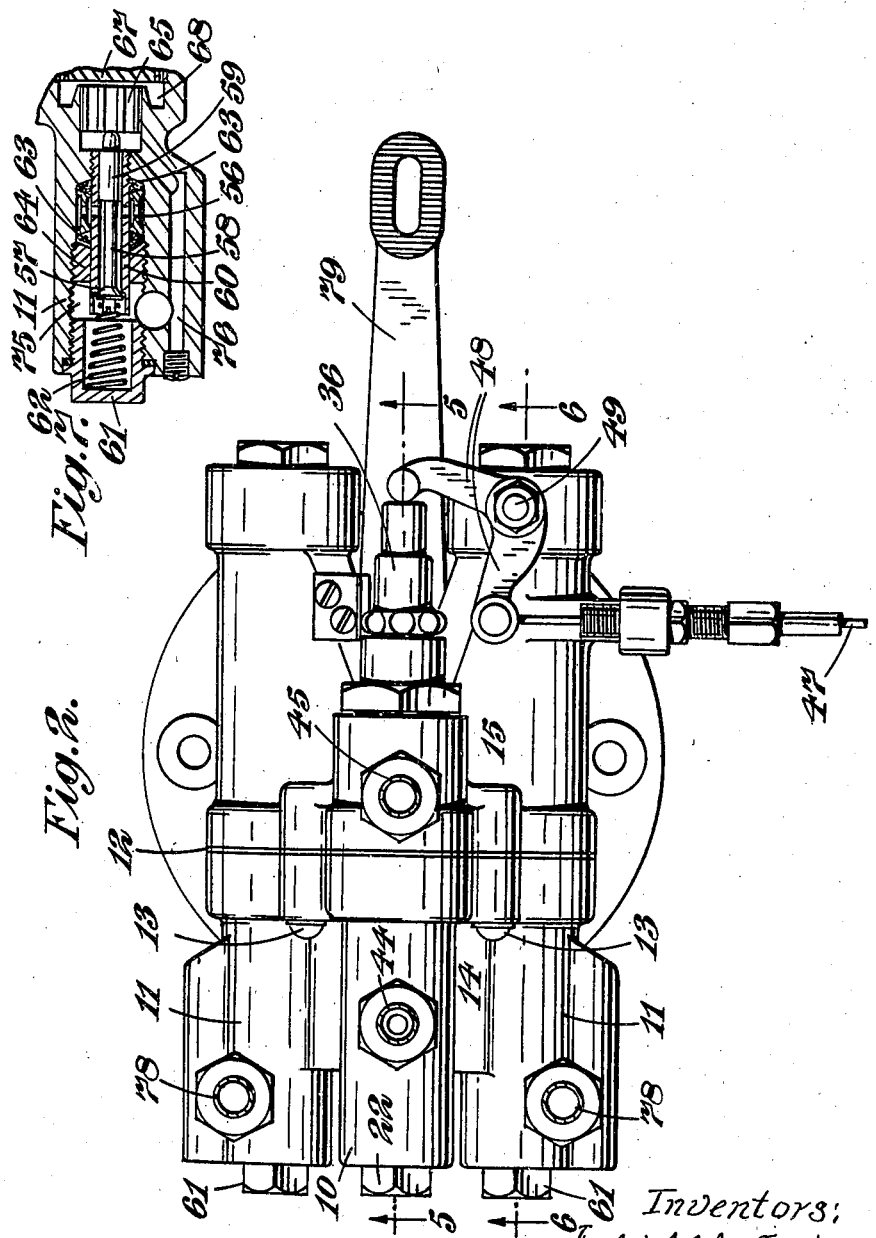

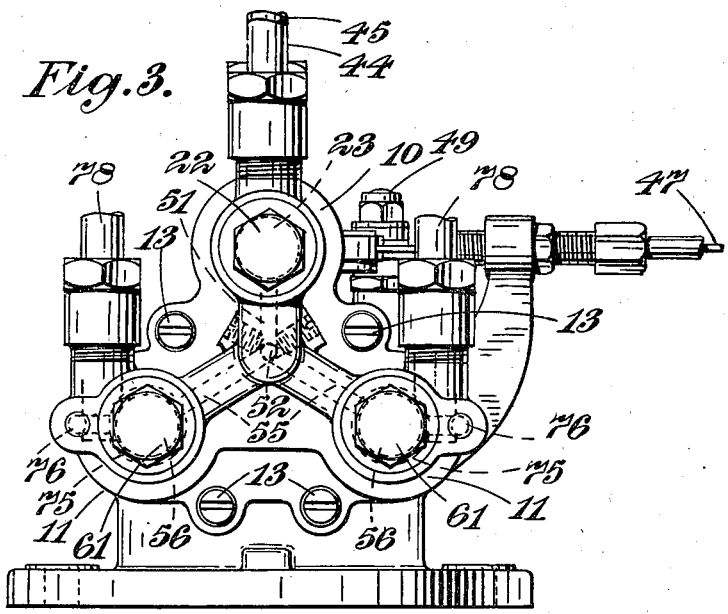
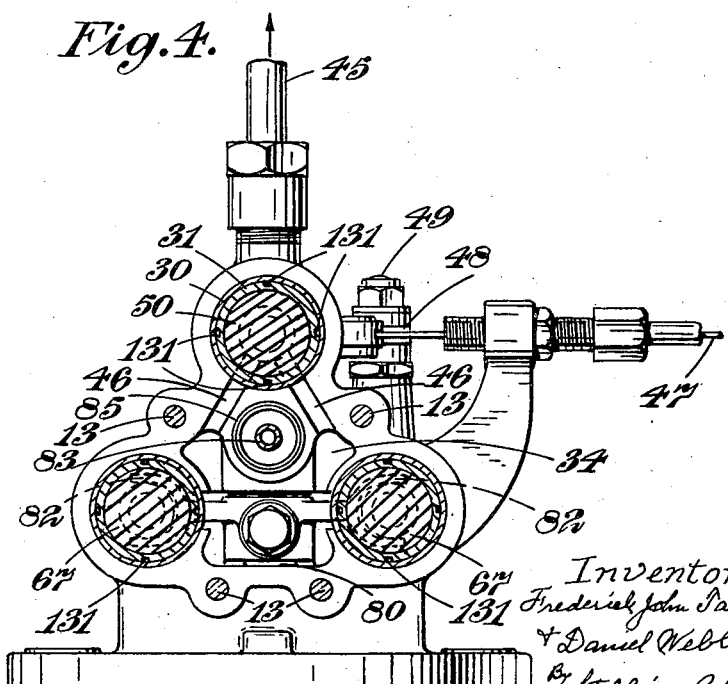

Nov. 4, 1941.  F. J. TARRIS ET AL  2,261,668

HYDRAULICALLY OPERATED BRAKE MECHANISM

Filed Feb. 8, 1940  4 Sheets-Sheet 4

Inventors:
Frederick John Tarris
+ Daniel Webb.
By Stebbins, Blenko & Parmelee, attys Patented Nov. 4, 1941

2,261,668

UNITED STATES PATENT OFFICE 2,261,668

HYDRAULICALLY OPERATED BRAKE MECHANISM

Frederick John Tarris and Daniel Webb, London, England, assignors to The India-Rubber, Gutta Percha & Telegraph Works Company, Limited, London, England, a British company Application February 8, 1940, Serial No. 317,980
In Great Britain February 11, 1939

15 Claims. (Cl. 303—54)

This invention consists in improvements in or relating to hydraulically operated brake mechanisms and the invention is applied to and is limited to what may be termed a power operated hydraulic brake mechanism. The term "power operated hydraulic brake mechanism" is to be understood as applying to a mechanism which is operated from a supply of hydraulic pressure derived from a power driven source such as a power driven pump and is thus to be distinguished from a brake mechanism operated from a hydraulic pressure supply generated by an operator at the time of operation of the mechanism as, for example, by hand or by foot.

A power operated mechanism is, however, to be understood as including a mechanism operated by hydraulic pressure obtained from a hydraulic accumulator which may originally have been charged by hand or by foot or which could be so charged in an emergency; and in fact the invention includes brake mechanisms when they are operated either from a source of hydraulic pressure obtained by power driven means during the time of operation or from an accumulated or stored hydraulic pressure supply.

An object of the invention is to provide a power operated mechanism which will be capable of satisfactory operation and control despite variations in the pressure of the hydraulic supply.

According to the present invention, the mechanism comprises in combination brake actuating means, a conduit leading thereto from the pressure supply and affording a valve chamber, and a control valve which is accommodated in the valve chamber as a substantially balanced valve and which serves to regulate pressure supplied through the said conduit to the brake actuating means.

Conveniently, the valve has substantially balanced pressure receiving surfaces so situated as to receive pressures exerted in directions in which the valve itself moves when it is opened and closed. Preferably, the admission of pressure fluid to the valve chamber occurs laterally, with respect to the direction of valve movement.

In one example of the invention, the valve is accommodated for endwise movement in the valve chamber and is formed at one end with a valve head and at the other end as a piston slidable in the chamber, and the chamber itself is provided adjacent one end thereof with a valve seat to co-operate with a valve head.

The foregoing and other features of the invention will be more clearly understood from the following description of one preferred example of the invention described in connection with the accompanying drawings, in which—

Figure 6:
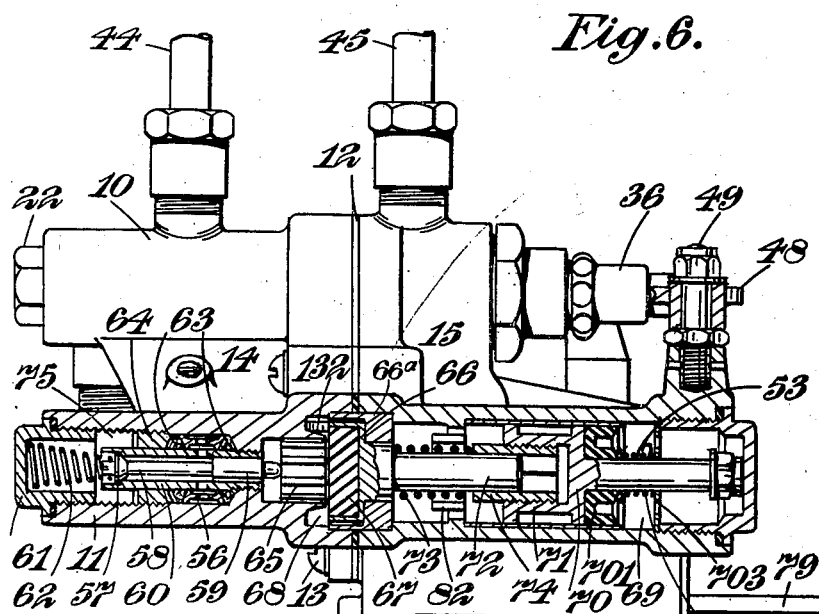

Figure 1 is a side elevation of the device;
Figure 2 is a plan of the mechanism illustrated in Figure 1;
Figure 3 is an end view looking from the left of Figure 1;
Figure 4 is a section on the line 4—4 of Figure 1, looking in the direction of the arrows;
Figure 5 is a section on the line 5—5 of Figure 2, looking in the direction of the arrows;
Figure 6 is a section on the line 6—6 of Figure 2, looking in the direction of the arrows, and
Figure 7 is a section on the line 7—7 of Figure 1, looking in the direction of the arrows.

Like reference numerals indicate like parts in the several figures of the drawings.

The invention is intended principally for the operation of vehicle brakes and more especially for the operation of aircraft wheel brakes. Although it is designed particularly for this purpose it is, however, not limited thereto and may be applied to power operated hydraulic brake or equivalent mechanisms for whatever purpose such mechanisms may be desired.

In the example illustrated, the mechanism comprises three parts, namely, a main control element 10 and two auxiliary elements 11 both of which are exactly similar in construction and operation. For a purpose to be described more fully hereinafter the structure is composed of two main castings separated from one another by a fluid-tight gasket 12 and bolted together by means of bolts 13. The two main parts thus bolted together are indicated as a whole in Figure 1 by reference numerals 14 and 15 respectively.

As seen most clearly in Figure 5 the working parts of the main control element 10 contained in the portion 14 comprise a balanced control valve having a valve head 16, a valve stem 17 and a piston or enlarged end portion 18. The control valve is mounted in a valve sleeve 20 which is screwthreaded at 21 into one end of a tubular bore 23 extending through the part 14 of the apparatus and at its left-hand end the sleeve 20 affords a valve seat for the valve head 16 and at its right hand end affords a sliding fit with the piston or enlargement 18. The cap 22 screwthreaded into the outer end of the bore 23 serves to contain a compression spring 24 which presses on to the end of the valve so as normally to hold the valve head 16 on to its seat. A lateral passage 25 enters the bore 23 at a position normally intermediate the head 16 and the enlargement 18 and serves to deliver pressure fluid to a space which surrounds the sleeve 20 and is bounded by gland packings 26 on each side adjusted to the required pressure by a packing screw 27. Inlet apertures 28 in sleeve 20 permit the pressure fluid to pass through the passage 25 to the space within the sleeve 20 surrounding the valve stem 17 but as the valve is a substantially balanced valve the comparatively light pressure of spring 24 will serve to maintain the valve seated and prevent pressure fluid escaping from the valve casing.

The end of valve stem 18 abuts against a tappet 19, the outer surface of which is formed with a number of flutes equally spaced around the periphery and extending parallel to the axis of the valve. These flutes ensure free fluid communication of pressure fluid past the tappet which serves to transmit movement from the exhaust valve 50 to the valve stem 18. This exhaust valve has a resilient face so as to be capable of limited movement towards and away from the valve stem 16 after the exhaust valve has closed upon its seating.

The bore 23 is enlarged at 29 and this enlargement is coaxial with a corresponding and coaxial enlargement in the part 15. When the two parts 14 and 15 are bolted together this enlargement accommodates a fixed shouldered sleeve 30 in which an annular member 31 is a sliding fit of two diameters corresponding to the two diameters of the sleeve 30. In the member 31 are formed spaced axial grooves 131 which serve to afford a dash-pot effect with regard to the movement of the member 31 in sleeve 30.

From the enlargement 29 slots 32 lead to an exhaust chamber 34 the shape and situation of which is shown most clearly by reference to Figures 4 and 5.

In a bore coaxial with the bore 23 in part 14 and provided partly in the part 15 and partly in a plug member 151 screwthreaded therein, there is situated a plunger 35 slidingly mounted in a sleeve 36, which latter is screwthreaded into the end of the bore in the plug member 151. Between a shoulder 37 on the plunger 35 and the opposite end of the sleeve 36 is accommodated a compression spring 38 tending always to return the plunger to the right of Figure 5. The plunger is formed with an enlarged head 39 which is a sliding fit in an enlargement 40 of the bore in the plug member 151 and between the head 39 and the adjacent reduced portion of the member 31 is a compression spring 41. A packing 42 surrounding the plunger 35 immediately behind the head 39 serves to prevent leakage of pressure fluid past the plunger 35.

From the bore enlargement 40 there extends an exhaust passage 43 and both passages 25 and 43 are coupled by means of pipe unions with conduits 44 and 45 respectively, the former being connected with the source of pressure fluid supply and the latter being connected to a fluid exhaust, or in the case of a pump driven source of supply to the inlet of the pump. In the part 15 there are slots 46 (see Figure 4) communicating between the chamber 34 and the bore enlargement 40.

In operation the plunger 35 is actuated by the pilot or driver of the vehicle through a Bowden cable 47 and a bellcrank lever 48 pivotally mounted at 49 on the part 15.

The operation of the main control element 10 will first be described because it will be seen from what follows that except for the positive mechanical operation of a plunger such as 35 the operation of the auxiliary elements 11 is substantially identical.

When it is desired by the operator to apply hydraulic pressure to the brake system to which the apparatus is connected the Bowden cable 47 will be operated to move bellcrank 48 to force the plunger 35 inwardly towards the left in Figure 5. In so doing, spring 41 will be loaded to a degree depending upon the amount of movement imparted to plunger 35 and this spring loading will first close the exhaust valve 50 and then via the tappet 19 and on account of the resilience of the valve face or washer 50 (held within the annulus of member 31) will press against tappet 19 to move it also to the left of Figure 5. This has the effect of moving valve head 16 from its seat thereby allowing pressure fluid to pass from supply conduit 44 through enlargement 23 to passage 51 formed in the part 14. This passage communicates with another passage 52 which in its turn communicates with branch passages 53 leading to the operating end of the two auxiliary elements 11. The passage 51 also communicates with another passage 54 leading to the portion of the bore 23 in which the tappet 19 operates. There are still two further passages 55 communicating between passage 52 and inlets to spaces 56 in the auxiliary elements corresponding to the space surrounding sleeve 20 of the main control element.

The pressure of the fluid will build up in the system to an extent determined by the amount of movement imparted to plunger 35 and when the pressure tends to reach or approach that corresponding to the loading of spring 41 the resilient face of the exhaust valve 50 will be deformed without being unseated until the inlet valve 16 is free from thrust therefrom. As the pressures on this valve 16 are substantially balanced spring 24 will reassert itself to tend to close valve 16 on to its seat. Should the operator now reduce the pressure on the plunger 35 and thus on the spring 41 the fluid pressure operating against the face of the exhaust valve member 50 will further assert itself and force back the said member so as to open the exhaust valve and allow pressure fluid to flow from passage 51 and associated passages to the exhaust space 34 and conduit 45.

Turning now to the auxiliary control elements, they each comprise a control valve having a valve head 57, stem 58 and piston-like enlargement 59 corresponding to the portions 16, 17 and 18 of the main control element. Sleeve 60, cap 61, spring 62, gland packings 63, gland nut 64, tappet 65 and annular member 66 with its contained resilient element 67, all correspond exactly with the similar parts above described in connection with the main control element. Continuations of slot 32 open into chambers 68 associated with members 66 thereby establishing communication between chambers 68 and the exhaust chamber 34.

Instead of mechanical operation of a plunger such as 35 the member 66 is now moved by hydraulic pressure admitted through passage 53 into a cylinder 69 which is coaxial with valve sleeve 60 and in the cylinder 69 is a piston 70 having a cup-shaped packing washer 701 and an axially recessed portion 71 to receive slidingly within it a stem 72 on the member 66. The packing washer 701 is held against the piston 70 by a light compression spring 702 which bears against an apertured partition member 703. A compression spring 73 is located between the end of a bushing 74 (that is held within the recessed portion 71 and actually serves to guide the stem 72) and a shoulder on the member 66. This spring 73 corresponds to spring 41 of the main control element and the piston 70 corresponds to the plunger 35.

As seen in Figure 7 the portion 75 of the bore into which valve head 57 opens and which corresponds to the portion 23 of the bore in Figure 5, is connected to a passage 76 leading to the space between piston 59 and relief valve 67 just as in the main control element passage 54 leads from passage 52 into a corresponding position. Pressure fluid is admitted direct from bore 75 to conduit 78 and thence to the apparatus in which the pressure fluid is to be applied, for example, the brake actuating mechanism. The conduit 78 actually opens at its lower end both to bore 75 and passage 76.

It will be understood, therefore, that just as in the case of the main control element fluid pressure in passage 52 will be regulated in accordance with the degree of movement imparted to plunger 35 so the pressure in conduit 78 will be similarly regulated by the auxiliary control element and the entire hydraulic system will be maintained filled with the hydraulic medium at all times.

It will be seen in the case of both the main and auxiliary control elements that the exhaust valves each have an enlarged head 31 or 66 respectively surrounded by a collar 30 or 66a respectively and in the enlarged head there are one or more grooves 131 to permit liquid to pass between the valve head and the collar which is a sliding fit on the stem of the exhaust valve. The latter thus has a head moving in effect in a dash-pot and this serves to prevent a fluid hammer action on the exhaust valve and also to prevent any valve chatter. This effect is aided by the provision of only indirect communicating channels between the control valve and the exhaust valve. The collar surrounding the exhaust valve head constitutes a fixed bush in the recess in which it is located and communication with the exhaust or return conduit 43 is established through slot 32 in the case of the main control element, or the corresponding slots 132 in the cases of the auxiliary control elements.

In providing the dash-pot action for the exhaust valve grooves such as 131 may be formed in the inner surface of the part 30 or 66a or they may be partly formed in each of the surfaces of the valve and the surrounding collar.

Assuming that the auxiliary control elements 11 serve to regulate brake pressures to the wheels respectively on opposite sides of the fore and aft centre line of an aircraft, with the apparatus so far described equal braking pressures can be applied to a regulatable degree within the limits of the hydraulic pressures available. It will, however, from time to time be required differentially to brake the wheels on the two sides of the centre line referred to so as to aid in turning the craft as it travels over the ground. For this purpose a lever 79 is provided secured to a spindle 80 that is pivotally mounted in end ball bearings 81, and extends through an enlargement of the exhaust chamber 34. To ensure fluid tightness of the exhaust chamber 34 a packing gland 801 surrounds the end of the spindle 80 which extends from the said chamber. This spindle is centrally disposed in the apparatus and within the aforesaid enlargement of the exhaust chamber 34 has oppositely directed lateral arms terminating in forks 82; one fork for each auxiliary device (see particularly Figures 5 and 6). These forks extend through slots into the space between the exhaust valve heads 66 and the pistons 70. Assuming that the apparatus has been operated to apply an equal braking pressure to both brake actuating mechanisms through the auxiliary control elements, differential braking can be effected by swinging the lever 79 to one side or the other with the consequent result that fork 82 will engage one of the piston extensions 71 to force it back against the pressure of the hydraulic medium, thereby neutralising the hydraulic pressure effect which would otherwise be available through the medium of that auxiliary control element. The other fork swinging as it will in the opposite direction moves away from its associated part 71 and does nothing. Thus, one of the brake actuating mechanisms will be operated at full pressure and the other will remain inoperative or, according to the degree of movement imparted to the lever 79, will be less forcefully operative by an amount corresponding to the retrograde movement that has been imparted to the piston 70.

In the apparatus described above, operation of the brakes is effected independently of variations in the pressure of the supply of hydraulic fluid which may vary from a hundred pounds per square inch up to over a thousand pounds per square inch since the hydraulic supply in aircraft will be required not only for braking but for the operation of many auxiliary devices of the craft. Not only is the operation of the brakes unaffected but the feel of the control devices actuated by the operator will also be unaffected by variations of the pressure supply.

It will be observed in Figure 5 that in order to carry the communication between conduits 51 and 53 through the exhaust gap between the two castings 14 and 15 a pipe 83 is held at each end in packings 84 and the requisite pressure is supplied to the latter by sleeves 85 screwthreaded into corresponding recesses in the respective castings 14 and 15.

We claim:

1. Hydraulic brake mechanism operated from a pressure supply derived from a power source, said mechanism comprising in combination a valve chamber having a pressure fluid supply conduit leading into it, an outlet conduit leading from it to communicate with brake actuating devices, a valve in the valve chamber which serves to regulate pressure supplied to the outlet conduit and which is formed to constitute when closed a balanced valve with respect to the fluid supply pressure, and conduits which serve when the valve is opened to lead pressure fluid which passes the valve and builds up beyond the latter to opposed balanced valve surfaces whereby the valve is balanced also when opened, a yieldingly loaded operating device applicable to the valve to open it, means to lead built up pressure to said operating means in a direction to release its pressure from the valve, an exhaust valve having an operative engagement with the balanced valve, a variably loaded yielding device engaging the exhaust valve, and a plunger for variably loading the yielding device, the said balanced valve, exhaust valve, yielding device and plunger being all coaxially arranged.

2. Hydraulic brake mechanism operated from a pressure supply derived from a power source, said mechanism having three associated structures each comprising in combination a valve chamber having a pressure fluid supply conduit leading into it, an outlet conduit leading from it to communicate with brake actuating devices, a valve in the valve chamber which serves to regulate pressure supplied to the outlet conduit and which is formed to constitute when closed a balanced valve with respect to the fluid supply pressure, and conduits which serve when the valve is opened to lead pressure fluid which passes the valve and builds up beyond the latter to opposed balanced valve surfaces whereby the valve is balanced also when opened, a yieldingly loaded operating device applicable to the valve to open it, means to lead built up pressure to said operating means in a direction to release its pressure from the valve, and in combination with these three structures manually controlled means for loading the yielding operating device applicable to the valve of one structure, piston means for loading the corresponding operating devices of the other two structures, and conduits leading from the outlet of the first-named structure to the pistons which serve to load the operating devices of the other two structures.

3. Hydraulic brake mechanism operated from a pressure supply derived from a power source, said mechanism comprising in combination a valve chamber having a pressure fluid supply conduit leading into it, an outlet conduit leading from it to communicate with brake actuating devices, a valve in the valve chamber which serves to regulate pressure supplied to the outlet conduit and which is formed to constitute when closed a balanced valve with respect to the fluid supply pressure, and conduits which serve when the valve is opened to lead pressure fluid which passes the valve and builds up beyond the latter to opposed balanced valve surfaces whereby the valve is balanced also when opened, a yieldingly loaded operating device applicable to the valve to open it, means to lead built up pressure to said operating means in a direction to release its pressure from the valve and an exhaust valve and conduits to conduct to one face of the exhaust valve pressure fluid passing through the outlet that is controlled by the balanced valve.

4. Hydraulic brake mechanism operated from a pressure supply derived from a power source, said mechanism comprising in combination a valve chamber having a pressure fluid supply conduit leading into it, an outlet conduit leading from it to communicate with brake actuating devices, a valve in the valve chamber which serves to regulate pressure supplied to the outlet conduit and which is formed to constitute when closed a balanced valve with respect to the fluid supply pressure, and conduits which serve when the valve is opened to lead pressure fluid which passes the valve and builds up beyond the latter to opposed balanced valve surfaces whereby the valve is balanced also when opened, a yieldingly loaded operating device applicable to the valve to open it, means to lead built up pressure to said operating means in a direction to release its pressure from the valve, an exhaust valve and conduits to conduct to one face of the exhaust valve pressure fluid passing through the outlet that is controlled by the balanced valve, means positively to move the exhaust valve by application of pressure to that face of the latter remote from the face that is subjected to fluid pressure passed by the balanced valve and an operative connection between the exhaust and the balanced valve whereby the positive movement of the exhaust valve lifts the balanced valve from its seat.

5. Hydraulic brake mechanism operated from a pressure supply derived from a power source, said mechanism comprising in combination a valve chamber having a pressure fluid supply leading into it, an outlet conduit leading from it to communicate with brake actuating devices, a valve in the valve chamber which serves to regulate pressure supplied to the outlet conduit and which is formed to constitute when closed a balanced valve with respect to the fluid supply pressure, and conduits which serve when the valve is opened to lead pressure fluid which passes the valve and builds up beyond the latter to opposed balanced valve surfaces whereby the valve is balanced also when opened, a yieldingly loaded operating device applicable to the valve to open it, means to lead built up pressure to said operating means in a direction to release its pressure from the valve, an exhaust valve and conduits to conduct to one face of the exhaust valve pressure fluid passing through the outlet that is controlled by the balanced valve, means positively to move the exhaust valve by application of pressure to that face of the latter remote from the face that is subjected to fluid pressure passed by the balanced valve and an operative connection between the exhaust and the balanced valve whereby the positive movement of the exhaust valve lifts the balanced valve from its seat, and that surface of the exhaust valve which engages the balanced valve is resilient.

6. Hydraulic brake mechanism operated from a pressure supply derived from a power source, said mechanism comprising in combination a valve chamber having a pressure fluid supply conduit leading into it, an outlet conduit leading from it to communicate with brake actuating devices, a valve in the valve chamber which serves to regulate pressure supplied to the outlet conduit and which is formed to constitute when closed a balanced valve with respect to the fluid supply pressure, and conduits which serve when the valve is opened to lead pressure fluid which passes the valve and builds up beyond the latter to opposed balanced valve surfaces whereby the valve is balanced also when opened, a yieldingly loaded operating device applicable to the valve to open it, means to lead built up pressure to said operating means in a direction to release its pressure from the valve, an exhaust valve and conduits to conduct to one face of the exhaust valve pressure fluid passing through the outlet that is controlled by the balanced valve, means positively to move the exhaust valve by application of pressure to that face of the latter remote from the face that is subjected to fluid pressure passed by the balanced valve and an operative connection between the exhaust and the balanced valve whereby the positive movement of the exhaust valve lifts the balanced valve from its seat, and that surface of the exhaust valve which engages the balanced valve is associated with a resilient element.

7. Hydraulic brake mechanism operated from a pressure supply derived from a power source, said mechanism comprising in combination a valve chamber having a pressure fluid supply conduit leading into it, an outlet conduit leading from it to communicate with brake actuating devices, a valve in the valve chamber which serves to regulate pressure supplied to the outlet conduit and which is formed to constitute when closed a balanced valve with respect to the fluid supply pressure, and conduits which serve when the valve is opened to lead pressure fluid which passes the valve and builds up beyond the latter to opposed balanced valve surfaces whereby the valve is balanced also when opened, a yieldingly loaded operating device applicable to the valve to open it, means to lead built up pressure to said operating means in a direction to release its pressure from the valve, an exhaust valve and conduits to conduct to one face of the exhaust valve pressure fluid passing through the outlet that is controlled by the balanced valve, means positively to move the exhaust valve by application of pressure to that face of the latter remote from the face that is subjected to fluid pressure passed by the balanced valve and an operative connection between the exhaust and the balanced valve whereby the positive movement of the exhaust valve lifts the balanced valve from its seat, and that surface of the exhaust valve which engages the balanced valve is resilient and has associated with it yielding pressure transmitting means capable of variable loading for the purpose of establishing a correspondingly variable opening of the balanced valve.

8. Hydraulic brake mechanism operated from a pressure supply derived from a power source, said mechanism comprising in combination a valve chamber having a pressure fluid supply conduit leading into it, an outlet conduit leading from it to communicate with brake actuating devices, a valve in the valve chamber which serves to regulate pressure supplied to the outlet conduit and which is formed to constitute when closed a balanced valve with respect to the fluid supply pressure, and conduits which serve when the valve is opened to lead pressure fluid which passes the valve and builds up beyond the latter to opposed balanced valve surfaces whereby the valve is balanced also when opened, a yieldingly loaded operating device applicable to the valve to open it, means to lead built up pressure to said operating means in a direction to release its pressure from the valve, auxiliary control devices each having in it a balanced valve and a relief valve, and means to convey hydraulic pressure passed by each said balanced valve in those devices to brake actuating mechanisms and also to the relief valve.

9. Hydraulic brake mechanism operated from a pressure supply derived from a power source, said mechanism comprising in combination a valve chamber having a pressure fluid supply conduit leading into it, an outlet conduit leading from it to communicate with brake actuating devices, a valve in the valve chamber which serves to regulate pressure supplied to the outlet conduit and which is formed to constitute when closed a balanced valve with respect to the fluid supply pressure, and conduits which serve when the valve is opened to lead pressure fluid which passes the valve and builds up beyond the latter to opposed balanced valve surfaces whereby the valve is balanced also when opened, a yieldingly loaded operating device applicable to the valve to open it, means to lead built up pressure to said operating means in a direction to release its pressure from the valve, an exhaust valve, conduits to conduct to one face of the exhaust valve pressure fluid passing through the outlet that is controlled by the balanced valve and means to damp movements of the exhaust valve.

10. Hydraulic brake mechanism according to claim 9 in which the means to damp movements of the exhaust valve comprises dashpot damping means associated with that valve.

11. Hydraulic brake mechanism according to claim 9 in which the means to damp movements of the exhaust valve comprises dashpot damping means associated with that valve.

11. Hydraulic brake mechanism according to claim 9 in which the means to damp movements of the exhaust valve comprises dashpot damping means of which the exhaust valve comprises an element.

12. Hydraulic brake mechanism according to claim 9 in which the means to damp movements of the exhaust valve comprises a dashpot having a chamber in which the exhaust valve is a sliding fit and in which a restricted passage is provided for fluid between spaces at the front and the rear of the exhaust valve.

13. Hydraulic brake mechanism according to claim 9 in which the means to damp movements of the exhaust valve comprises a dashpot having a chamber in which the exhaust valve is a sliding fit and in which restricted passage is provided for fluid between spaces at the front and the rear of the exhaust valve, and the said restricted passage is formed in the surface of the exhaust valve.

14. Hydraulic brake mechanism according to claim 9 in which the means to damp movements of the exhaust valve comprises a dashpot having a chamber in which the exhaust valve is a sliding fit and in which a restricted passage is provided for fluid between spaces at the front and the rear of the exhaust valve, and the restricted passage is formed in the surface of the chamber in which the exhaust valve slides.

15. Hydraulic brake mechanism according to claim 9 in which the means to damp movements of the exhaust valve comprises a dashpot having a chamber in which the exhaust valve is a sliding fit and in which a restricted passage is provided for fluid between spaces at the front and rear of the exhaust valve and the said restricted passage is formed partly in the surface of the chamber in which the exhaust valve slides.

FREDERICK JOHN TARRIS.
DANIEL WEBB.